US008929591B2

(12) United States Patent
Calman et al.

(10) Patent No.: US 8,929,591 B2
(45) Date of Patent: Jan. 6, 2015

(54) PROVIDING INFORMATION ASSOCIATED WITH AN IDENTIFIED REPRESENTATION OF AN OBJECT

(75) Inventors: Matthew A. Calman, Charlotte, NC (US); Erik Stephen Ross, Charlotte, NC (US); Alfred Hamilton, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 392 days.

(21) Appl. No.: 13/342,056

(22) Filed: Jan. 1, 2012

(65) Prior Publication Data
US 2012/0230538 A1 Sep. 13, 2012

Related U.S. Application Data

(60) Provisional application No. 61/450,213, filed on Mar. 8, 2011, provisional application No. 61/478,407, filed on Apr. 22, 2011.

(51) Int. Cl.
*G06K 9/00* (2006.01)
*G06Q 30/02* (2012.01)
*G06F 17/30* (2006.01)

(52) U.S. Cl.
CPC ............ *G06K 9/00671* (2013.01); *G06Q 30/02* (2013.01); *G06F 17/30247* (2013.01)
USPC ................................ 382/103; 705/14; 705/44

(58) Field of Classification Search
None
See application file for complete search history.

(56) References Cited

U.S. PATENT DOCUMENTS

| 5,638,457 | A | * | 6/1997 | Deaton et al. ................. 382/100 |
| 6,055,513 | A | * | 4/2000 | Katz et al. .................. 705/26.41 |
| 7,016,532 | B2 | | 3/2006 | Boncyk et al. |
| 7,155,228 | B2 | | 12/2006 | Rappaport et al. |
| 7,336,890 | B2 | * | 2/2008 | Lu et al. ........................ 386/239 |
| 7,403,652 | B2 | | 7/2008 | Boncyk et al. |
| 7,412,081 | B2 | | 8/2008 | Doi |
| 7,424,303 | B2 | | 9/2008 | Al-Sarawi |
| 7,477,780 | B2 | | 1/2009 | Boncyk et al. |

(Continued)

OTHER PUBLICATIONS

International Search Report and Written Opinion, corresponding to International Patent Application No. PCT/US12/27890, dated Feb. 5, 2013.

(Continued)

*Primary Examiner* — Chan Park
*Assistant Examiner* — Iman K Kholdebarin
(74) *Attorney, Agent, or Firm* — Michael A. Springs; Moore & Van Allen PLLC; W. Kevin Ransom

(57) ABSTRACT

Methods, apparatus systems and computer program products are described herein that provide for using video or still shot analysis, such as AR or the like, to assist the user of mobile devices with receiving information corresponding to an abstraction or representation of a subject. Some subjects are difficult to capture in a video or still shot. The method and devices described herein capture representations of difficult to capture or unavailable subjects and presents information related to the subject with the representation. In an embodiment, the representation is a screenshot and the information is provided related to the application that is represented by the screenshot. Various other types of representations including depictions, advertisements, portions of, and identifying marks can be identified by the system and method and information presented relating to the corresponding subjects. In some cases, the information is customized with financial information of the user.

11 Claims, 10 Drawing Sheets

(56) References Cited

U.S. PATENT DOCUMENTS

| | | | |
|---|---|---|---|
| 7,526,280 B2 | 4/2009 | Jung et al. | |
| 7,564,469 B2 | 7/2009 | Cohen | |
| 7,565,008 B2 | 7/2009 | Boncyk et al. | |
| 7,680,324 B2 | 3/2010 | Boncyk et al. | |
| 7,751,805 B2* | 7/2010 | Neven et al. | 455/414.3 |
| 7,775,437 B2 | 8/2010 | Cohen | |
| 7,792,738 B2 | 9/2010 | Channell | |
| 7,832,632 B2* | 11/2010 | Meek et al. | 235/379 |
| 7,881,529 B2 | 2/2011 | Boncyk et al. | |
| 7,899,243 B2 | 3/2011 | Boncyk et al. | |
| 7,899,252 B2 | 3/2011 | Boncyk et al. | |
| 8,138,930 B1 | 3/2012 | Heath | |
| 8,184,893 B2* | 5/2012 | Calman | 382/135 |
| 8,364,015 B2* | 1/2013 | Russ et al. | 386/245 |
| 8,438,110 B2* | 5/2013 | Calman et al. | 705/44 |
| 8,582,850 B2* | 11/2013 | Calman et al. | 382/128 |
| 8,668,498 B2* | 3/2014 | Calman et al. | 434/80 |
| 8,718,612 B2* | 5/2014 | Calman et al. | 455/414.1 |
| 8,721,337 B2* | 5/2014 | Calman et al. | 434/93 |
| 8,793,303 B2* | 7/2014 | Speicher et al. | 709/203 |
| 2003/0064705 A1 | 4/2003 | Desiderio | |
| 2004/0021584 A1 | 2/2004 | Hartz et al. | |
| 2004/0024709 A1 | 2/2004 | Yu et al. | |
| 2004/0170392 A1* | 9/2004 | Lu et al. | 386/96 |
| 2006/0100951 A1 | 5/2006 | Mylet et al. | |
| 2006/0240862 A1* | 10/2006 | Neven et al. | 455/550.1 |
| 2007/0140595 A1 | 6/2007 | Taylor et al. | |
| 2008/0030580 A1* | 2/2008 | Kashiwa et al. | 348/158 |
| 2008/0040278 A1 | 2/2008 | Dewitt | |
| 2008/0214210 A1 | 9/2008 | Rasanen et al. | |
| 2008/0268876 A1 | 10/2008 | Gelfand et al. | |
| 2009/0094125 A1 | 4/2009 | Killian et al. | |
| 2009/0102859 A1 | 4/2009 | Athsani et al. | |
| 2009/0140839 A1 | 6/2009 | Bishop et al. | |
| 2009/0144164 A1 | 6/2009 | Wane et al. | |
| 2009/0171850 A1 | 7/2009 | Yuval | |
| 2009/0182748 A1 | 7/2009 | Walker | |
| 2009/0204511 A1 | 8/2009 | Tsang | |
| 2009/0250515 A1 | 10/2009 | Todd et al. | |
| 2010/0060739 A1* | 3/2010 | Salazar | 348/148 |
| 2010/0130226 A1 | 5/2010 | Arrasvuori et al. | |
| 2010/0185529 A1 | 7/2010 | Chesnut et al. | |
| 2010/0223165 A1* | 9/2010 | Calman et al. | 705/30 |
| 2010/0250581 A1 | 9/2010 | Chau | |
| 2010/0260373 A1* | 10/2010 | Neven et al. | 382/100 |
| 2011/0022540 A1 | 1/2011 | Stern et al. | |
| 2011/0034176 A1 | 2/2011 | Lord et al. | |
| 2011/0119155 A1 | 5/2011 | Hammad et al. | |
| 2011/0153341 A1* | 6/2011 | Diaz-Cortes | 705/2 |
| 2011/0202466 A1 | 8/2011 | Carter | |
| 2011/0317008 A1* | 12/2011 | Sam | 348/143 |
| 2012/0229625 A1* | 9/2012 | Calman et al. | 348/135 |
| 2012/0230538 A1* | 9/2012 | Calman et al. | 382/103 |
| 2012/0232966 A1* | 9/2012 | Calman et al. | 705/14.1 |
| 2012/0232976 A1* | 9/2012 | Calman et al. | 705/14.25 |
| 2012/0232993 A1* | 9/2012 | Calman et al. | 705/14.58 |
| 2012/0233003 A1* | 9/2012 | Calman et al. | 705/16 |
| 2012/0265679 A1* | 10/2012 | Calman et al. | 705/43 |
| 2012/0265809 A1* | 10/2012 | Hanson et al. | 709/204 |
| 2013/0033522 A1* | 2/2013 | Calman et al. | 345/633 |
| 2013/0046589 A1* | 2/2013 | Grigg et al. | 705/14.1 |
| 2013/0046602 A1* | 2/2013 | Grigg et al. | 705/14.25 |
| 2013/0046603 A1* | 2/2013 | Grigg et al. | 705/14.25 |
| 2013/0054367 A1* | 2/2013 | Grigg et al. | 705/14.58 |
| 2013/0114877 A1* | 5/2013 | Meek et al. | 382/138 |
| 2013/0156317 A1* | 6/2013 | Calman | 382/182 |
| 2014/0006259 A1* | 1/2014 | Grigg et al. | 705/39 |

OTHER PUBLICATIONS

PCT, PCT International Search Report and Written Opinion of the International Searching Authority for International Application No. PCT/US12/28008, date of completion of international search May 22, 2012.

PCT, PCT International search Report and Written Opinion of the International Searching Authority for International Application No. PCT/US12/28036, date of completion of international search May 28, 2012.

International Preliminary Report on Patentability for International Patent Application PCT/US2012/027912, Mailed Sep. 19, 2013.

International Preliminary Report on Patentability for International Patent Application PCT/US2012/028036, Mailed Sep. 19, 2013.

International Preliminary Report on Patentability for International Patent Application PCT/US2012/028008, Mailed Sep. 19, 2013.

International Preliminary Report on Patentability for International Patent Application PCT/US2012/027890, Mailed Sep. 19, 2013.

International Preliminary Report on Patentability for International Patent Application PCT/US2012/027892, Mailed Sep. 19, 2013.

ISA/US Commissioner for Patents, PCT International Search Report and The Written Opinion of the International Searching Authority for International Application No. PCT/US12/48697 date of completion Sep. 24, 2012, date of mailing Oct. 12, 2012.

PCT, PCT International Search Report and Written Opinion of the International Searching Authority for International Application No. PCT/US2012/027912 date of completion of international search Jun. 8, 2012.

PCT, PCT International search Report and Written Opinion of the International Searching Authority for International Application No. PCT/US12/27892 date of completion of international search Jun. 14, 2012.

International Preliminary Report on Patentability for International Application No. PCT/US2012/048697 issued on Feb. 4, 2014.

* cited by examiner

PROVIDING INFORMATION ASSOCIATED WITH AN IDENTIFIED REPRESENTATION OF AN OBJECT

CROSS-REFERENCE TO RELATED APPLICATIONS

This application claims priority to U.S. Provisional Patent Application Ser. No. 61/450,213, filed Mar. 8, 2011, entitled "Real-Time Video Image Analysis Applications for Commerce Activity," and U.S. Provisional Patent Application Ser. No. 61/478,407, filed Apr. 22, 2011, entitled "Providing Information Associated with an Identified Representation of an Object," the entirety of each of which is incorporated herein by reference.

BACKGROUND

Modern handheld mobile devices, such as smart phones or the like, combine multiple technologies to provide the user with a vast array of capabilities. For example, many smart phones are equipped with significant processing power, sophisticated multi-tasking operating systems, and high-bandwidth Internet connection capabilities. Moreover, such devices often have addition features that are becoming increasing more common and standardized features. Such features include, but are not limited to, location-determining devices, such as Global Positioning System (GPS) devices; sensor devices, such as accelerometers; and high-resolution video cameras.

As the hardware capabilities of such mobile devices have increased, so too have the applications (i.e., software) that rely on the hardware advances. One such example of innovative software is a category known as augmented reality (AR), or more generally referred to as mediated reality. One such example of an AR application platform is Layar, available from Layar, Amsterdam, the Netherlands.

The Layar platform technology analyzes location data, compass direction data, and the like in combination with information related to the objects, locations or the like in the video stream or still shot to create browse-able "hot-spots" or "tags" that are superimposed on the mobile device display, resulting in an experience described as "reality browsing".

In some situations, objects are abstract and cannot be adequately captured in a video stream or still shot. For example, software programs such as mobile device applications are abstract and difficult to capture in a video stream or still shot. Further, some objects are concrete but commonly reproduced in abstract form. For example, photographs of individuals are an abstraction of the person represented therein. Also, some objects are represented by abstract symbols or identifiers, such as trademarks or logos. Individuals are interested in the objects represented by these abstractions, not in the abstractions themselves. However, individuals may find it difficult to gather information from abstractions because they are not the actual object of interest but only represent the object in some form.

Therefore, a need exists to implement video or still shot analysis, i.e., AR or the like, to assist the user of mobile devices with receiving information based on an abstraction of an object.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, apparatus systems and computer program products are described herein that provide for using video or still shot analysis, such as AR or the like, to assist the user of mobile devices with receiving information corresponding to an abstraction or representation of a subject. Through the use of real-time video, objects, logos, artwork, products, locations and other features that can be recognized in the real-time video stream can be matched to data associated with such to assist the user with receiving information based on representations related to subjects that are not easily capturable in video or still shots. In specific embodiments, the data that is matched to the images in the real-time video stream is specific to financial institutions, such as customer financial behavior history, customer purchase power/transaction history and the like. In this regard, many of the embodiments herein disclosed leverage financial institution data, which is uniquely specific to a financial institution, in providing information to mobile device users in connection with real-time video stream analysis.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

In some embodiments, a method of presenting information based on a captured representation of a subject is provided. In an embodiment, the method includes recognizing, via a mobile device, the representation of the subject; identifying, via a computing device processor, the subject based on an analysis of the representation; retrieving information corresponding to the subject; and presenting information using the mobile device, the information related to the subject presented in conjunction with presentation of the representation.

In some embodiments, the method also includes capturing the representation from a still shot and analyzing the still shot to identify the subject. Optionally, the method can include capturing the representation from a video and analyzing the video to identify the subject. In some embodiments, the still shot or video are captured in real time while in other embodiments the still shot or video or saved as a file and provided to the mobile device for analysis. In some embodiments, the method customizes the information with financial information of a user of the mobile device or of the subject. For example, the information can be customized with account information, purchase history, and/or demographic data of the user.

The representation disclosed herein can vary widely. In an exemplary embodiment, the representation is a screenshot of an application installed on or executing on a computing device. The computing device may be any type of personal or business computing device, such as a mobile phone, a desktop computer, a laptop computer, a tablet computer, a video game console, or a personal digital assistant. In other embodiments, the representation is a depiction, advertisement, portion of, or identifying mark for a subject.

Embodiments of the invention also provide an apparatus where the apparatus has a device for capturing a video stream or still shot, a processor configured to determine which representations from the video stream or still shot are associated with subjects, and a display for presenting the video stream with information, the information being associated with the subjects corresponding to the representations. In some embodiments, the information is presented real-time in the video stream. In further embodiments, the apparatus includes a microphone and the subject is identified, at least in part by an audio recording from the microphone.

The apparatus also includes a computing platform having a processor, a memory in communication with the processor, and logic stored in the memory and executable by the processor. In some embodiments, the logic includes image capture logic configured to capture a video stream comprising a representation of the subject. The logic may also include analysis logic configured to analyze the representation of the subject, image identification logic configured to identify the subject from the analysis of the representation, and presentation logic configured to present information related to the subject in the video.

In some embodiments, the apparatus also includes a network interface device configured to wirelessly connect to a database comprising a plurality of subjects and associated representations. In still further embodiments, the apparatus includes customization logic stored in the memory and executable by the processor, wherein the customization logic is configured to customize a presentation for the user. The presentation can be customized with the user's financial information, such as previous transactions between the user and the identified subject.

Embodiments of the invention also provide a computer program product comprising a non-transitory computer-readable medium having computer-executable code stored thereon. In one embodiment, the computer-executable code includes: a first code portion configured to capture, via a mobile device, a video stream or still picture, a second code portion configured to determine which representations from the video stream or still shot are associated with subjects, and a third code portion configured to present on a display the video stream or still shot information on the subjects corresponding to the representations. In some embodiments, the computer program product also includes a database comprising a plurality of subjects and related representations. The computer program product may be stored on a mobile device such as a mobile phone, a personal digital assistant, a camera, or a tablet computer. In further embodiments, the computer program product includes instructions for customizing the information for the user, such as by providing information related to at least one previous transaction of the user or by providing coupons for the user.

The features, functions, and advantages that have been discussed may be achieved independently in various embodiments of the present invention or may be combined with yet other embodiments, further details of which can be seen with reference to the following description and drawings

BRIEF DESCRIPTION OF THE DRAWINGS

Figure 1:
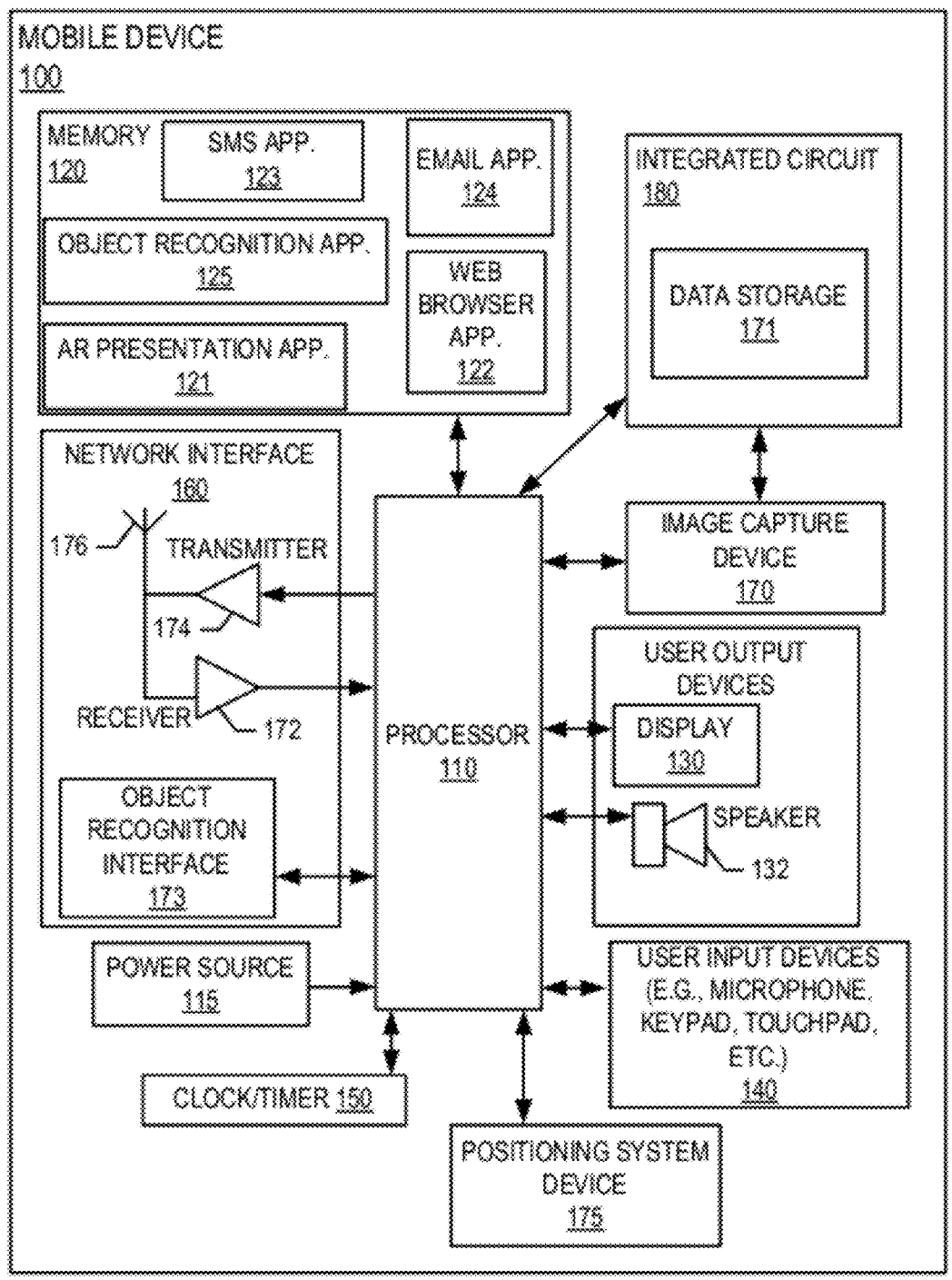
Figure 2:
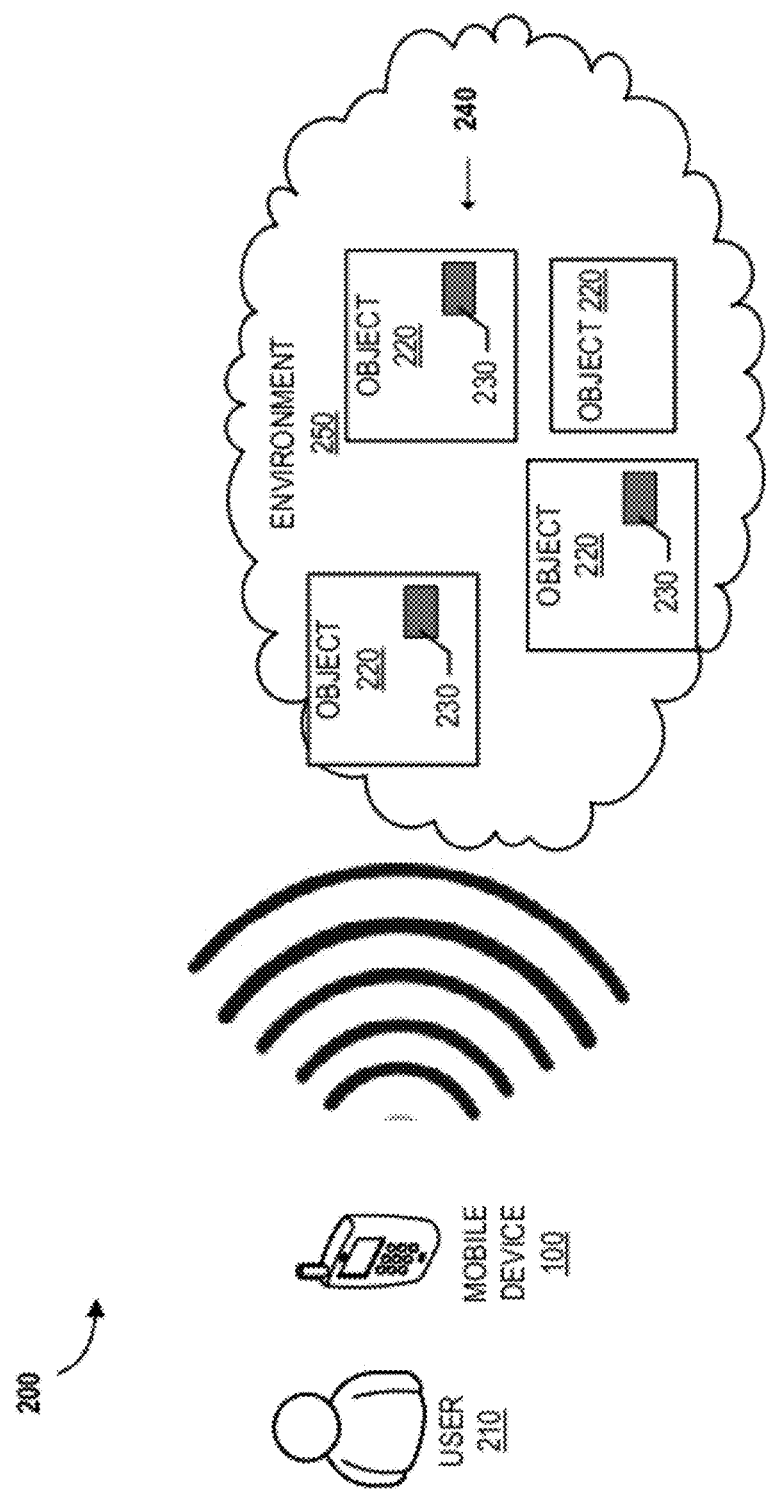
Figure 3:
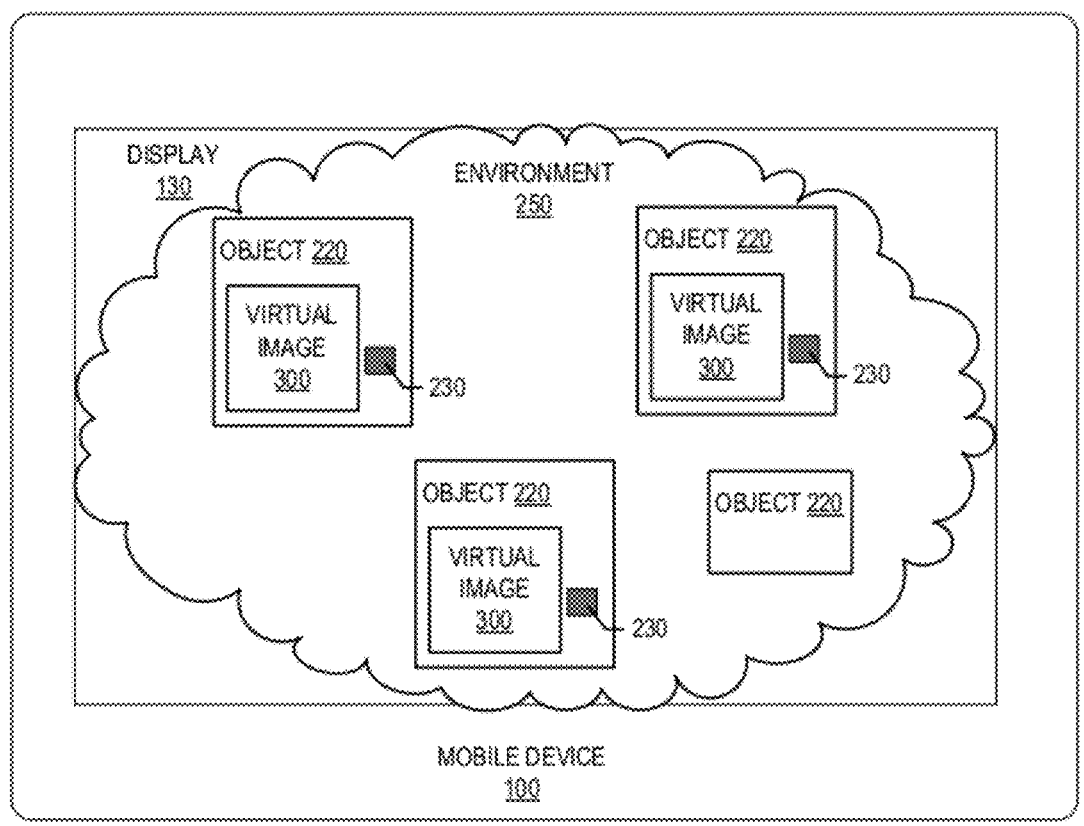
Figure 4:
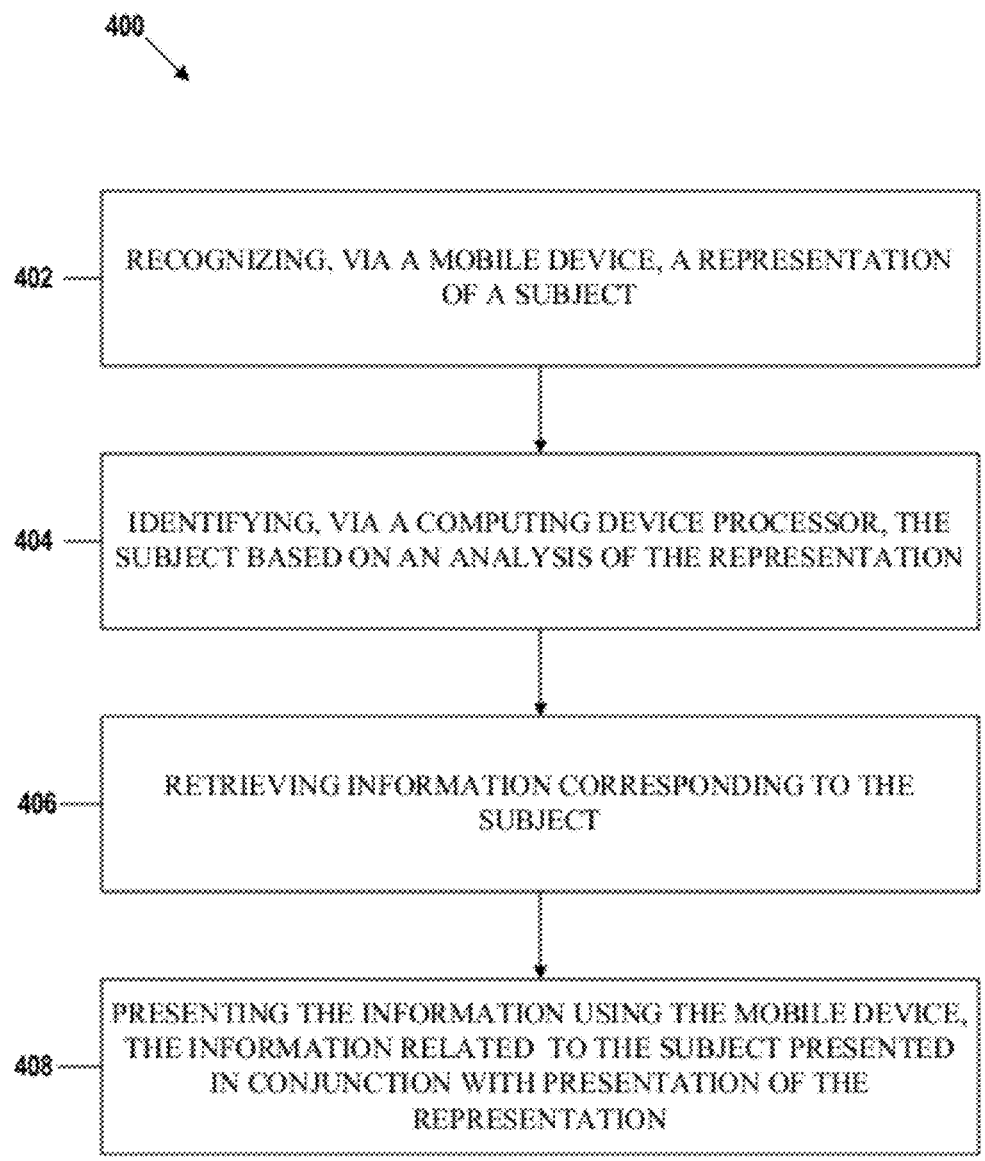
Figure 5:
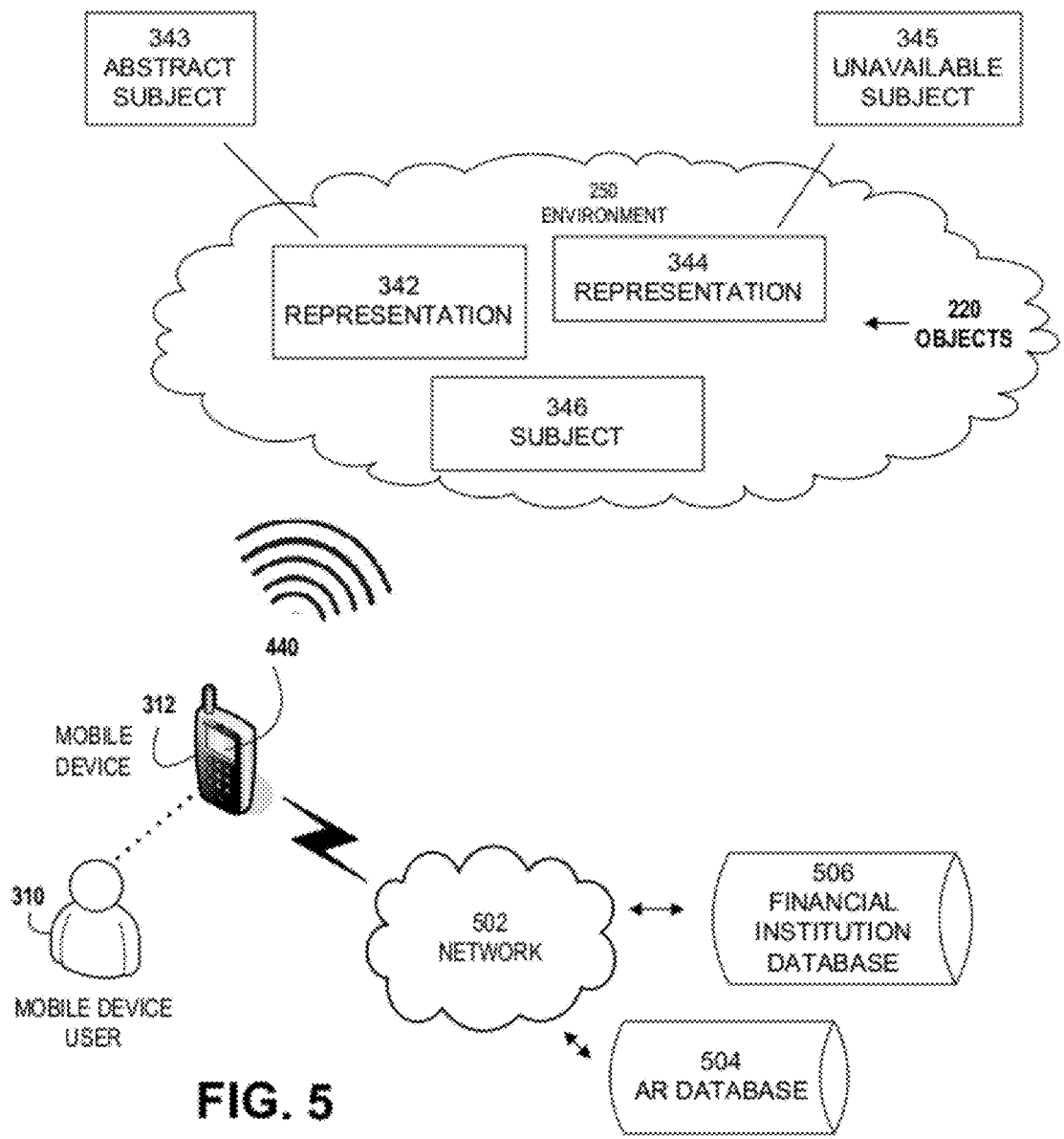
Figure 6:
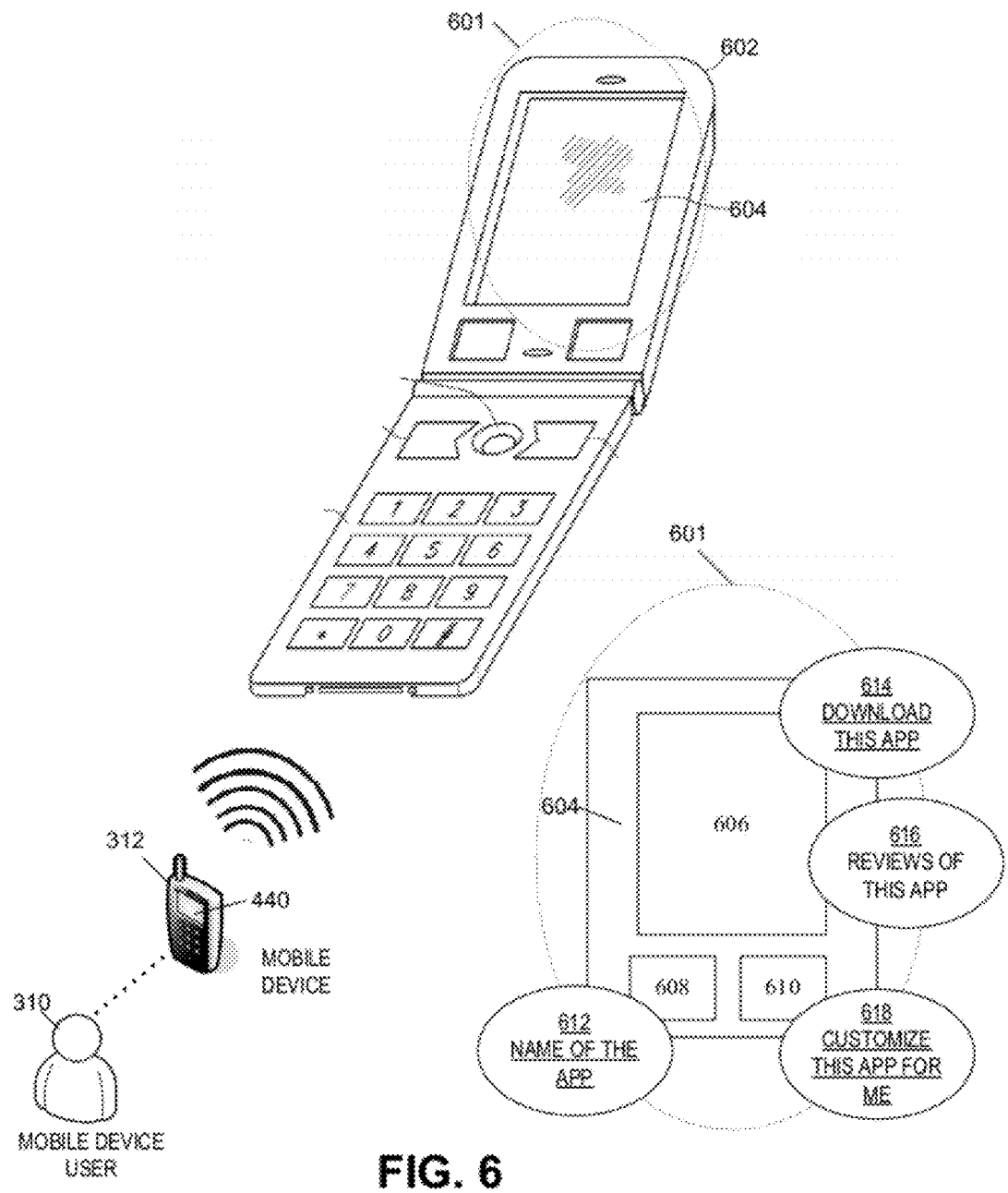
Figure 7:
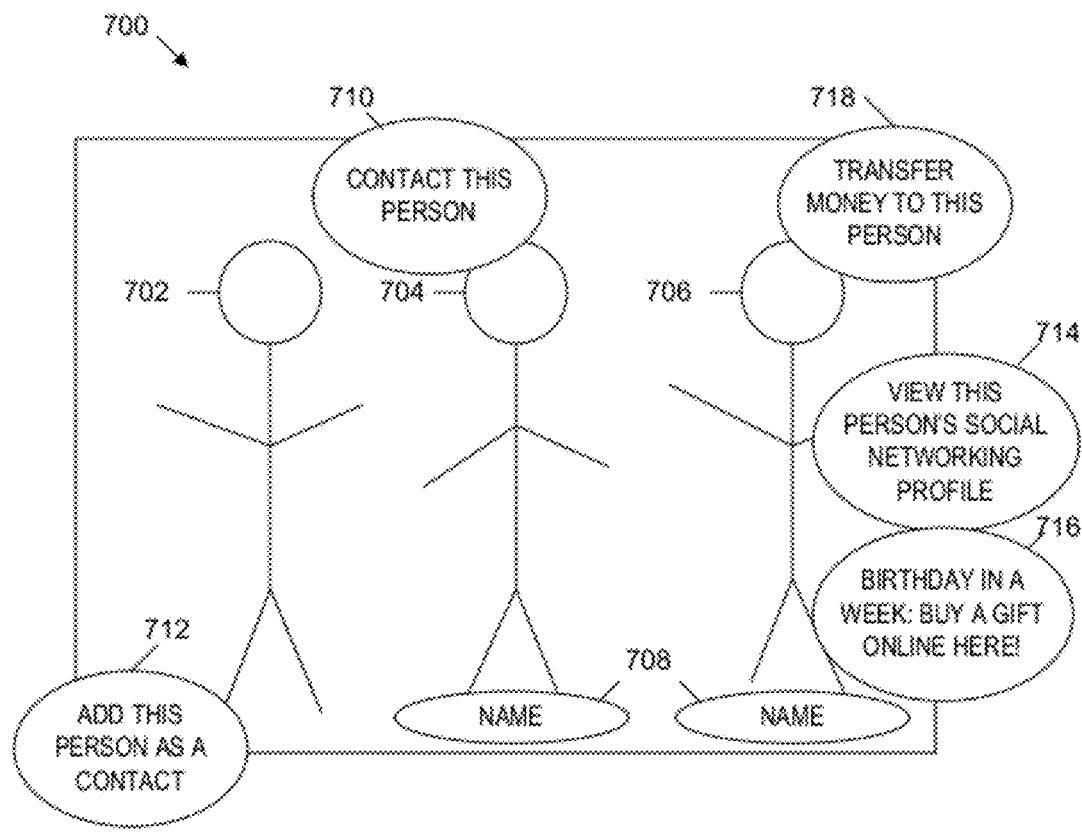
Figure 8:
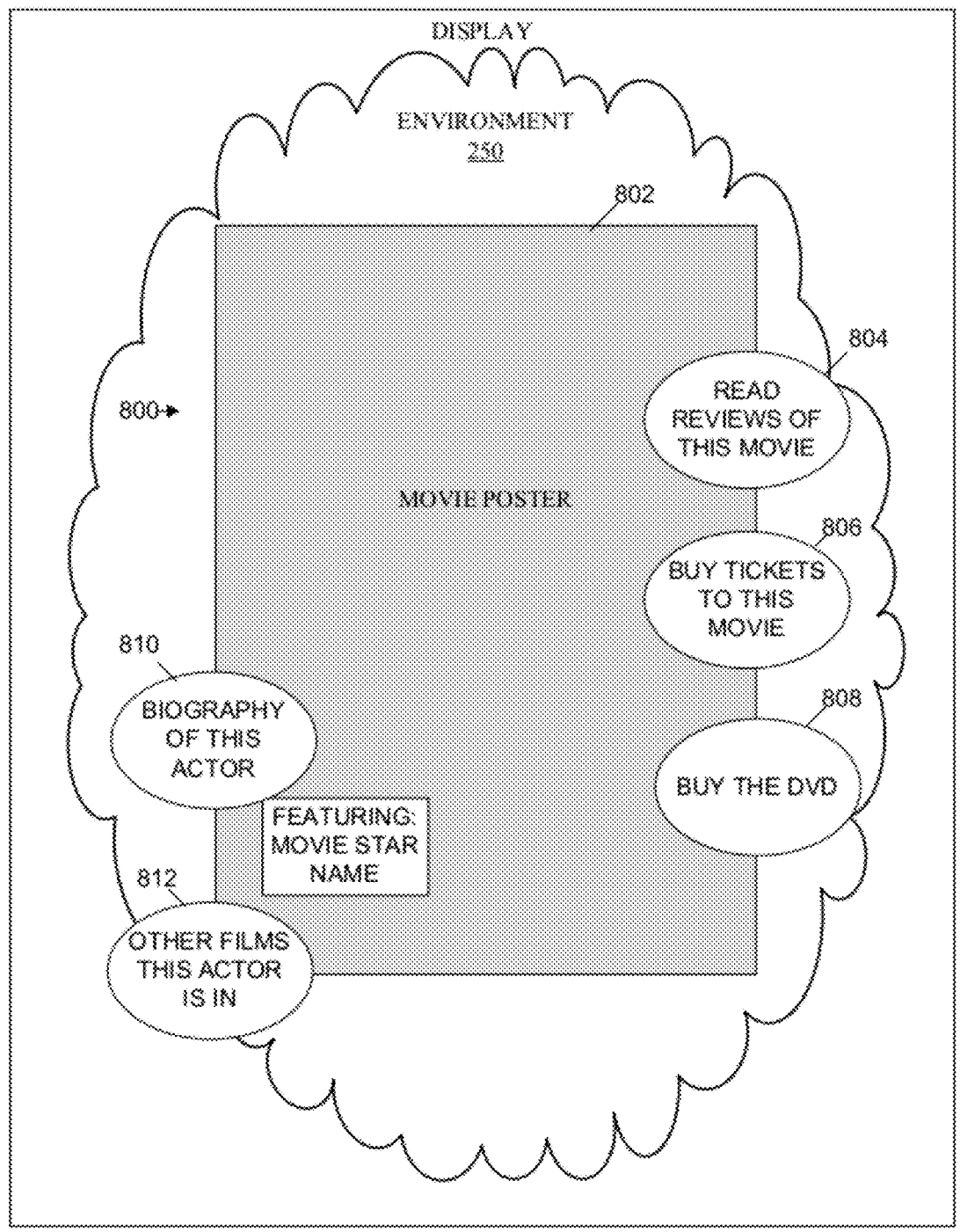
Figure 9:
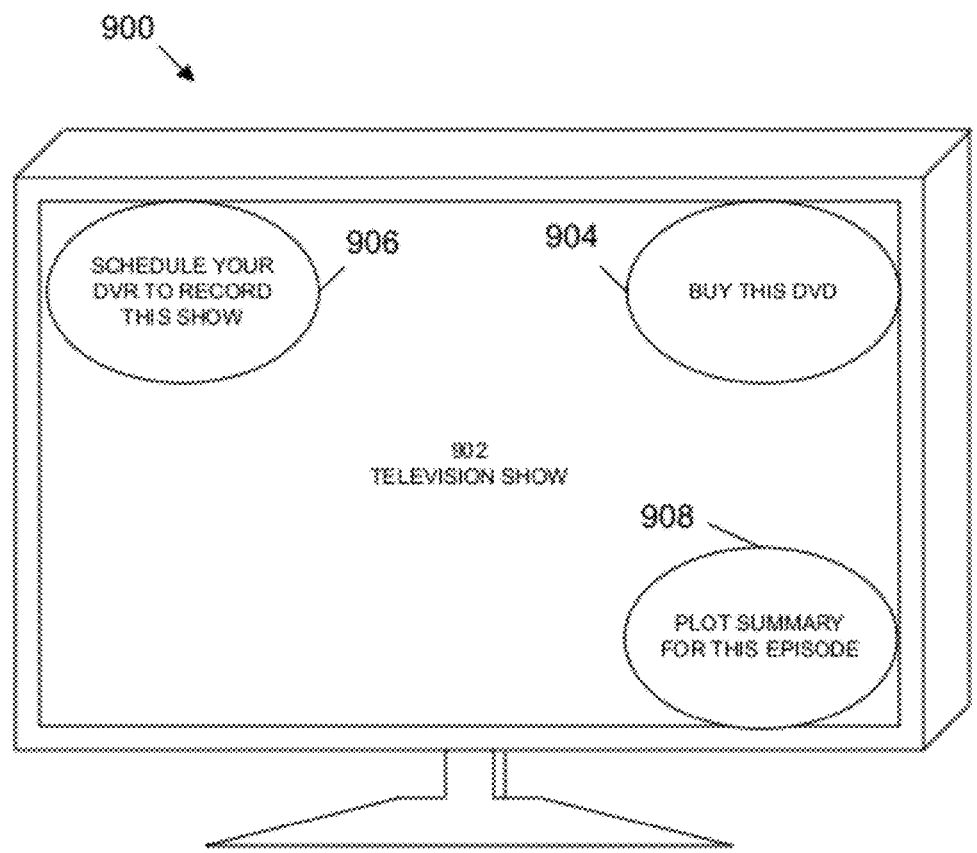
Figure 10:
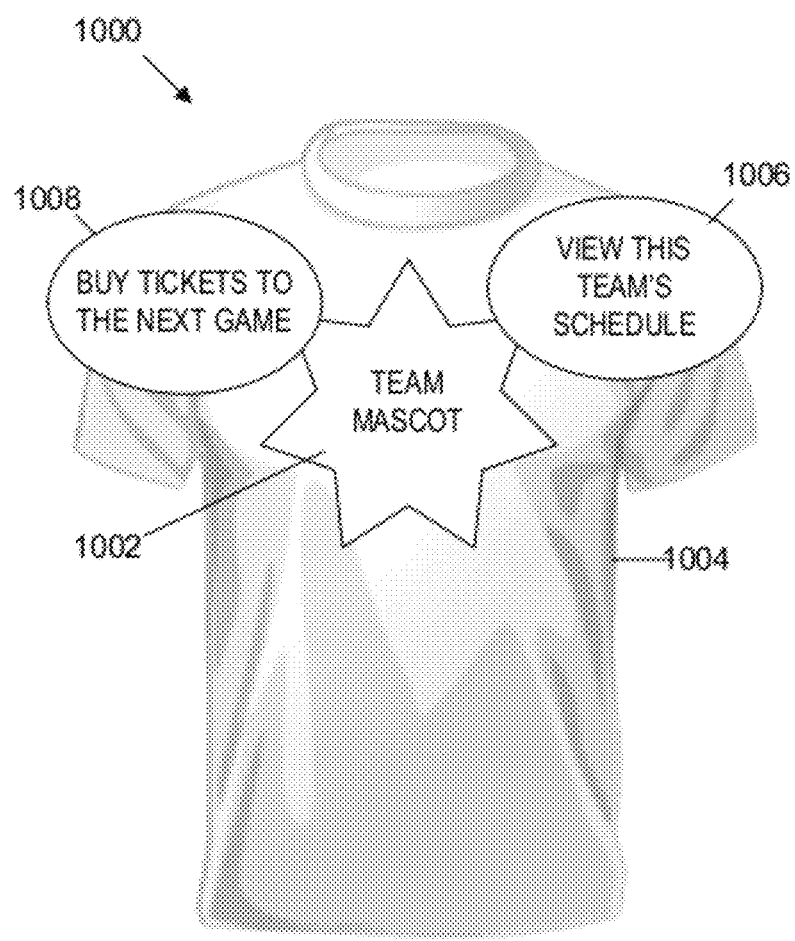

Having thus described embodiments of the invention in general terms, reference will now be made to the accompanying drawings, which are not necessarily drawn to scale, and wherein:

FIG. 1 is a block diagram illustrating a mobile device, in accordance with an embodiment of the invention;

FIG. 2 is a block diagram illustrating an AR environment, in accordance with an embodiment of the invention;

FIG. 3 is a block diagram illustrating a mobile device, in accordance with an embodiment of the invention;

FIG. 4 is a high level flow chart of a method for presenting information based on a captured representation of a subject, in accordance with an embodiment of the invention;

FIG. 5 is a block diagram illustrating an AR environment having both representations and subjects, in accordance with an embodiment of the invention;

FIG. 6 is a block diagram of the method for presenting information wherein the representation is a screenshot of an application, in accordance with an embodiment of the invention;

FIG. 7 is a block diagram of the method for presenting information wherein the representation is a depiction of a subject, in accordance with an embodiment of the invention;

FIG. 8 is a block diagram of the method for presenting information wherein the representation is an advertisement for a subject, in accordance with an embodiment of the invention;

FIG. 9 is a block diagram of the method for presenting information wherein the representation is a portion of a subject, in accordance with an embodiment of the invention; and FIG. 10 is a block diagram of the method for presenting information wherein the representation is an identifying mark, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The steps and/or actions of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method or algorithm may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, methods, systems, computer programs and the like are herein disclosed that provide for using real-time video analysis, such as AR or the like to assist the user of mobile devices with receiving information related to subjects corresponding to abstract representations in an environment. Through the use of real-time object recognition, objects, logos, artwork, products, locations and other features that can be recognized in the real-time video stream can be matched to data associated with such to assist the user with purchasing and/or customizing subjects represented in the AR environment. In specific embodiments, the data that is matched to the images in the real-time video stream is specific to financial institutions, such as customer financial behavior history, customer purchase power/transaction history and the like. In this regard, many of the embodiments herein disclosed leverage financial institution data, which is uniquely specific to financial institution, in providing information to mobile devices users in connection with real-time video stream analysis.

While embodiments discussed herein are generally described with respect to "real-time video streams" or "real-time video" it will be appreciated that the video stream may be captured and stored for later viewing and analysis. Indeed, in some embodiments video is recorded and stored on a mobile device and portions or the entirety of the video may be analyzed at a later time. The later analysis may be conducted on the mobile device or loaded onto a different device for analysis. The portions of the video that may be stored and analyzed may range from a single frame of video (e.g., a screenshot) to the entirety of the video. Additionally, rather than video, the user may opt to take a still picture of the environment to be analyzed immediately or at a later time. Embodiments in which real-time video, recorded video or still pictures are analyzed are contemplated herein.

FIG. 1 illustrates an embodiment of a mobile device 100 that may be configured to execute object recognition and augmented reality (AR) functionality, in accordance with specific embodiments of the present invention. A "mobile device" 100 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

The mobile device 100 may generally include a processor 110 communicably coupled to such devices as a memory 120, user output devices 136, user input devices 140, a network interface 160, a power source 115, a clock or other timer 150, an image capture device 170 such as a camera, a positioning system device 175 (e.g., a Global Positioning System (GPS) device), one or more integrated circuits 180, etc.

In some embodiments, the mobile device 100 and/or the server access one or more databases or datastores (not shown in FIG. 1) to search for and/or retrieve information related to the object and/or marker. In some embodiments, the mobile device 100 and/or the server access one or more datastores local to the mobile device 100 and/or server and in other embodiments, the mobile device and/or server access datastores remote to the mobile device 100 and/or server. In some embodiments, the mobile device 100 and/or server access both a memory and/or datastore local to the mobile device and/or server as well as a datastore remote from the mobile device and/or server The processor 110, and other processors described herein, may generally include circuitry for implementing communication and/or logic functions of the mobile device 100. For example, the processor 110 may include a digital signal processor device, a microprocessor device, and various analog to digital converters, digital to analog converters, and/or other support circuits. Control and signal processing functions of the mobile device 100 may be allocated between these devices according to their respective capabilities. The processor 110 thus may also include the functionality to encode and interleave messages and data prior to modulation and transmission. The processor 110 may additionally include an internal data modem. Further, the processor 110 may include functionality to operate one or more software programs or applications, which may be stored in the memory 120. For example, the processor 110 may be capable of operating a connectivity program, such as a web browser application 122. The web browser application 122 may then allow the mobile device 100 to transmit and receive web content, such as, for example, location-based content and/or other web page content, according to a Wireless Application Protocol (WAP), Hypertext Transfer Protocol (HTTP), and/or the like.

The processor 110 may also be capable of operating applications, such as an object recognition application 125. The object recognition application 125 may be downloaded from a server and stored in the memory 120 of the device 100. Alternatively, the object recognition application 125 may be pre-installed and stored in a memory in the integrated circuit 180. In such an embodiment, the user may not download the object recognition application 125 from a server.

In some embodiments, the processor 110 may also be capable of operating one or more applications, such as one or more applications functioning as an artificial intelligence ("AI") engine. The processor 110 may recognize objects that it has identified in prior uses by way of the AI engine. In this way, the processor 110 may recognize specific objects and/or classes of objects, and store information related to the recognized objects in one or more memories and/or databases discussed herein. Once the AI engine has thereby "learned" of an object and/or class of objects, the AI engine may run concurrently with and/or collaborate with other modules or applications described herein to perform the various steps of the methods discussed. For example, in some embodiments, the AI engine recognizes an object that has been recognized before and stored by the AI engine. The AI engine may then communicate to another application or module of the mobile device and/or server, an indication that the object may be the same object previously recognized. In this regard, the AI engine may provide a baseline or starting point from which to determine the nature of the object. In other embodiments, the AI engine's recognition of an object is accepted as the final recognition of the object.

The processor 110 may also be capable of operating applications, such as an AR presentation application 121. The AR presentation application 121 may be downloaded from a server and stored in the memory 120 of the mobile device 100. Alternatively, the AR presentation application 121 may be pre-installed and stored in a memory in the Integrated circuit 180. In such an embodiment, the user may not download the AR presentation application 121 from a server.

The integrated circuit 180 may include the necessary circuitry to provide the object recognition and/or augmented reality functionality to the mobile device 100. Generally, the integrated circuit 180 will include data storage 171 which may include data associated with the objects within a video stream that the object recognition application 125 identifies as having a certain marker(s). The integrated circuit 180 and/or data storage 171 may be an integrated circuit, a microprocessor, a system-on-a-chip, a microcontroller, or the like. As discussed above, in one embodiment, the integrated circuit 180 may provide the object recognition and/or the AR functionality to the mobile device 100.

Of note, while FIG. 1 illustrates the integrated circuit 180 as a separate and distinct element within the mobile device 100, it will be apparent to those skilled in the art that the integrated circuit functionality may be incorporated within other elements in the mobile device 100. For instance, the functionality of the integrated circuit 180 may be incorporated within the mobile device memory 120 and/or processor 110. In a particular embodiment, the functionality of the integrated circuit 180 is incorporated in an element within the mobile device 100 that provides object recognition and/or AR capabilities to the mobile device 100. In some embodiments, the integrated circuit 180 functionality is present in the firmware of the mobile device 100. Still further, the integrated circuit 180 functionality may be included in a removable storage device such as an SD card or the like.

The processor 110 may be configured to use the network interface 160 to communicate with one or more other devices on a network. In this regard, the network interface 160 may include an antenna 176 operatively coupled to a transmitter 174 and a receiver 172 (together a "transceiver"). The processor 110 may be configured to provide signals to and receive signals from the transmitter 174 and receiver 172, respectively. The signals may include signaling information in accordance with the air interface standard of the applicable cellular system of the wireless telephone network that may be part of the network. In this regard, the mobile device 100 may be configured to operate with one or more air interface standards, communication protocols, modulation types, and access types. By way of illustration, the mobile device 100 may be configured to operate in accordance with any of a number of first, second, third, and/or fourth-generation communication protocols and/or the like. For example, the mobile device 100 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 100 may also be configured to operate in accordance with non-cellular communication mechanisms, such as via a wireless local area network (WLAN) or other communication/data networks.

The network interface 160 may also include an object recognition interface 173 in order to allow a user to execute some or all of the above-described processes with respect to the object recognition application 125 and/or the integrated circuit 180. The object recognition interface 173 may have access to the hardware, e.g., the transceiver, and software previously described with respect to the network interface 160. Furthermore, the object recognition interface 173 may have the ability to connect to and communicate with an external data storage on a separate system within the network as a means of recognizing the object(s) in the video stream.

As described above, the mobile device 100 may have a user interface that includes user output devices 136 and/or user input devices 140. The user output devices 136 may include a display 130 (e.g., a liquid crystal display (LCD) or the like) and a speaker 132 or other audio device, which are operatively coupled to the processor 110. The user input devices 140, which may allow the mobile device 100 to receive data from a user 210, may include any of a number of devices allowing the mobile device 100 to receive data from a user, such as a keypad, keyboard, touch-screen, touchpad, microphone, mouse, joystick, other pointer device, button, soft key, and/or other input device(s).

The mobile device 100 may further include a power source 115. Generally, the power source 115 is a device that supplies electrical energy to an electrical load. In one embodiment, power source 115 may convert a form of energy such as solar energy, chemical energy, mechanical energy, etc. to electrical energy. Generally, the power source 115 in a mobile device 100 may be a battery, such as a lithium battery, a nickel-metal hydride battery, or the like, that is used for powering various circuits, e.g., the transceiver circuit, and other devices that are used to operate the mobile device 100. Alternatively, the power source 115 may be a power adapter that can connect a power supply from a power outlet to the mobile device 100. In such embodiments, a power adapter may be classified as a power source "in" the mobile device.

The mobile device 100 may also include a memory 120 operatively coupled to the processor 110. As used herein, memory may include any computer readable medium configured to store data, code, or other information. The memory 120 may include volatile memory, such as volatile Random Access Memory (RAM) including a cache area for the temporary storage of data. The memory 120 may also include non-volatile memory, which can be embedded and/or may be removable. The non-volatile memory may additionally or alternatively include an electrically erasable programmable read-only memory (EEPROM), flash memory or the like.

The memory 120 may store any of a number of applications or programs which comprise computer-executable instructions/code executed by the processor 110 to implement the functions of the mobile device 100 described herein. For example, the memory 120 may include such applications as an object recognition application 125, an augmented reality (AR) presentation application 121, a web browser application 122, a Short Message Service (SMS) application 123, an electronic mail (i.e., email) application 124, etc.

Referring to FIG. 2, a block diagram illustrating an object recognition experience 200 in which a user 210 utilizes a mobile device 100 to capture a video stream that includes an environment 250 is shown. As denoted earlier, the mobile device 100 may be any mobile communication device. The mobile device 100 has the capability of capturing a video stream of the surrounding environment 250. The video capture may be by any means known in the art. In one particular embodiment, the mobile device 100 is a mobile telephone equipped with an image capture device 170 (e.g., a camera) capable of video capture.

The environment 250 contains a number of objects 240. Some of such objects 240 may include a marker 230 identifiable to an object recognition application that is either executed on the mobile device 100 or within the wireless network. A marker 230 may be any type of marker that is a distinguishing feature that can be interpreted by the object recognition application to identify specific objects 220. For instance, an AR marker may be alpha-numeric characters, symbols, logos, shapes, ratio of size of one feature to another feature, a product identifying code such as a bar code, electromagnetic radiation such as radio waves (e.g., radio frequency identification (RFID)), architectural features, color, etc. In some embodiments, the marker 230 may be audio and the mobile device 100 may be capable of utilizing audio recognition to identify words or unique sounds broadcast. The marker 230 may be any size, shape, etc. Indeed, in some embodiments, the marker 230 may be very small relative to the object 220 such as the alpha-numeric characters that identify the name or model of an object 220, whereas, in other embodiments, the marker 230 is the entire object 220 such as the unique shape, size, structure, etc.

In some embodiments, the marker 230 is not actually a physical marker located on or being broadcast by the object. For instance, the marker 230 may be some type of identifiable feature that is an indication that the object 220 is nearby (e.g., a tag or placard near the object). In some embodiments, the marker 230 for an object 220 may actually be the marker 230 for a different object 220. For example, the mobile device 100 may recognize a particular building as being "Building A." Data stored in the data storage 171 may indicate that "Building B" is located directly to the east and next to "Building A." Thus, markers 230 for an object 220 that are not located on or being broadcast by the object 220 are generally based on fixed facts about the object 220 (e.g., "Building B" is next to "Building A"). However, it is not a requirement that such a marker 230 be such a fixed fact. The marker 230 may be anything that enables the mobile device 100 to interpret to a desired confidence level what the object is. For another example, the mobile device 100, object recognition application 125 and/or AR presentation application 121 may be used to identify a particular person as a first character from a popular show, and thereafter utilize the information that the first character is nearby features of other characters to interpret that a second character, a third character, etc. are nearby, whereas without the identification of the first character, the features of the second and third characters may not have been used to identify the second and third characters. This example may also be applied to objects outside of people.

The marker 230 may also be or include social network data, such as data retrieved or communicated from the Internet, such as tweets, blog posts, social networking site posts, various types of messages and/or the like. In other embodiments, the marker 230 is provided in addition to social network data as mentioned above. For example, the mobile device 100 may capture a video stream and/or one or more still shots including a large gathering of people. In this example, as above, one or more people dressed as characters in costumes may be present at a specified location. The mobile device 100, object recognition application 125, and/or the AR presentation application 121 may identify several social network indicators, such as posts, blogs, tweets, messages, and/or the like indicating the presence of one or more of the characters at the specified location. In this way, the mobile device 100 and associated applications may communicate information regarding the social media communications to the user and/or use the information regarding the social media communications in conjunction with other methods of object recognition. For example, the mobile device 100, object recognition application 125, and/or the AR presentation application 121 performing recognition of the characters at the specified location may confirm that the characters being identified are in fact the correct characters based on the retrieved social media communications. This example may also be applied objects outside of people.

In some embodiments, the mobile device and/or server access one or more other servers, social media networks, applications and/or the like in order to retrieve and/or search for information useful in performing an object recognition. In some embodiments, the mobile device and/or server accesses another application by way of an application programming interface or API. In this regard, the mobile device and/or server may quickly search and/or retrieve information from the other program without requiring additional authentication steps or other gateway steps.

While FIG. 2 illustrates that the objects 220 with markers 230 only include a single marker 230, it will be appreciated that the object 220 may have any number of markers 230 with each equally capable of identifying the object 220. Similarly, multiple markers 230 may be identified by the mobile device 100 such that the combination of the markers 230 may be utilized to identify the object 220. For example, the mobile device 100 may utilize facial recognition markers 230 to identify a person and/or utilize a separate marker 230, such as the clothes the person is wearing to confirm the identification to the desired confidence level that the person is in fact the person the mobile device identified. For example, the facial recognition may identify a person as a famous athlete, and thereafter utilize the uniform the person is wearing to confirm that it is in fact the famous athlete.

In some embodiments, a marker 230 may be the location of the object 220. In such embodiments, the mobile device 100 may utilize Global Positioning System (GPS) hardware and/or software or some other location determining mechanism to determine the location of the user 210 and/or object 220. As noted above, a location-based marker 230 could be utilized in conjunction with other non-location-based markers 230 identifiable and recognized by the mobile device 100 to identify the object 220. However, in some embodiments, a location-based marker 230 may be the only marker 230. For instance, in such embodiments, the mobile device 100 may utilize GPS software to determine the location of the user 210 and a compass device or software to determine what direction the mobile device 100 is facing in order to identify the object 220. In still further embodiments, the mobile device 100 does not utilize any GPS data in the identification. In such embodiments, markers 230 utilized to identify the object 220 are not location-based.

FIG. 3 illustrates a mobile device 100, specifically the display 130, wherein the device 100 has executed an object recognition application 125 and/or an AR presentation application 121 to present within the display 130 indications of recognized objects within the vide stream (i.e., surrounding environment 250). The mobile device 100 is configured to rely on markers 230 to identify objects 220 that are associated with representations of objects, such as screenshots, depictions, advertisements, portions of, identifying marks, alphanumeric identifiers, and/or other representations of subjects, and indicate to the user 210 the identified objects 220 by displaying an indicator 300 on the mobile device display 130 in conjunction with the display of the video stream. As illustrated, if an object 220 does not have any markers 230 (or at least enough markers 230 to yield object identification), the object 220 will be displayed without an associated indicator 300.

The object recognition application 125 may use any type of means in order to identify desired objects 220. For instance, the object recognition application 125 may utilize one or more pattern recognition algorithms to analyze objects in the environment 250 and compare with markers 230 in data storage 171 which may be contained within the mobile device 100 (such as within the integrated circuit 180) or externally on a separate system accessible via the connected network. For example, the pattern recognition algorithms may include decision trees, logistic regression, Bayes classifiers, support vector machines, kernel estimation, perceptrons, clustering algorithms, regression algorithms, categorical sequence labeling algorithms, real-valued sequence labeling algorithms, parsing algorithms, general algorithms for predicting arbitrarily-structured labels such as Bayesian networks and Markov random fields, ensemble learning algorithms such as bootstrap aggregating, boosting, ensemble averaging, combinations thereof, and the like.

Upon identifying an object 220 within the real-time video stream, the AR presentation application 121 is configured to superimpose an indicator 300 on the mobile device display 130. The indicator 300 is generally a graphical representation that highlights or outlines the object 220 and may be activatable (i.e., include an embedded link) such that the user 210 may "select" the indicator 300 and retrieve information related to the identified object. The information may include any desired information associated with the selected object and may range from basic information to greatly detailed information. In some embodiments, the indicator 300 may provide the user 210 with an internet hyperlink to further information on the object 220. The information may include, for example, all types of media, such as text, images, clipart, video clips, movies, or any other type of information desired. In yet other embodiments, the indicator 300 information related to the identified object may be visualized by the user 210 without "selecting" the indicator 300.

In embodiments in which the indicator 300 provides an interactive tab to the user 210, the user 210 may select the indicator 300 by any conventional means, e.g., keystroke, touch, voice command, iris recognition, or the like, for interaction with the mobile device 100. For instance, in some embodiments, the user 210 may utilize an input device 140 such as a keyboard to highlight and select the indicator 300 in order to retrieve the information. In a particular embodiment, the mobile device display 130 includes a touch screen that the user may employ to select the indicator 300 utilizing the user's finger, a stylus, or the like.

In some embodiments, the indicator 300 is not interactive and simply provides information to the user 210 by superimposing the indicator 300 onto the display 130. For example, in some instances it may be beneficial for the AR presentation application 121 to merely identify an object 220, just identify the object's name/title, give brief information about the object, etc., rather than provide extensive detail that requires interaction with the indicator 300. The AR presentation application 121 is capable of being tailored to a user's desired preferences.

Furthermore, the indicator 300 may be displayed at any size on the mobile device display 130. The indicator 300 may be small enough that it is positioned on or next to the object 220 being identified such that the object 220 remains discernable behind the indicator 300. Additionally, the indicator 300 may be semi-transparent or an outline of the object 220 such that the object 220 remains discernable behind or enclosed by the indicator 300. In other embodiments, the indicator 300 may be large enough to completely cover the object 220 portrayed on the display 130. Indeed, in some embodiments, the indicator 300 may cover a majority or the entirety of the mobile device display 130.

The user 210 may opt to execute the object recognition application 125 and/or the AR presentation application 121 at any desired moment and begin video capture and analysis. However, in some embodiments, the object recognition application 125 and/or the AR presentation application 121 includes an "always on" feature in which the mobile device 100 is continuously capturing video and analyzing the objects 220 within the video stream. In such embodiments, the object recognition application 125 may be configured to alert the user 210 that a particular object 220 has been identified. The user 210 may set any number of user preferences to tailor the object recognition and AR experience to their needs. For instance, the user 210 may opt to only be alerted if a certain particular object 220 is identified. Additionally, it will be appreciated that the "always on" feature in which video is continuously captured may consume the mobile device power source 115 more quickly. Thus, in some embodiments, the "always on" feature may disengage if a determined event occurs such as low power source 115, low levels of light for an extended period of time (e.g., such as if the mobile device 100 is in a user's pocket obstructing a clear view of the environment 250 from the mobile device 100), if the mobile device 100 remains stationary (thus receiving the same video stream) for an extended period of time, the user sets a certain time of day to disengage, etc. Conversely, if the "always on" feature is disengaged due to the occurrence of such an event, the user 210 may opt for the "always on" feature to re-engage after the duration of the disengaging event (e.g., power source 115 is re-charged, light levels are increased, etc.).

In some embodiments, the user 210 may identify objects 220 that the object recognition application 125 does not identify and add it to the data storage 171 with desired information in order to be identified and/or displayed in the future. For instance, the user 210 may select an unidentified object 220 and enter a name/title and/or any other desired information for the unidentified object 220. In such embodiments, the object recognition application 125 may detect/record certain markers 230 about the object so that the pattern recognition algorithm(s) (or other identification means) may detect the object 220 in the future. Furthermore, in cases where the object information is within the data storage 171, but the object recognition application 125 fails to identify the object 220 (e.g., one or more identifying characteristics or markers 230 of the object has changed since it was added to the data storage 171 or the marker 230 simply was not identified), the user 210 may select the object 220 and associate it with an object 220 already stored in the data storage 171. In such cases, the object recognition application 125 may be capable of updating the markers 230 for the object 220 in order to identify the object in future video streams.

In addition, in some embodiments, the user 210 may opt to edit the information or add to the information provided by the indicator 300. For instance, the user 210 may opt to include user-specific information about a certain object 220 such that the information may be displayed upon a future identification of the object 220. Conversely, in some embodiments, the user may opt to delete or hide an object 220 from being identified and an indicator 300 associated therewith being displayed on the mobile device display 130.

Furthermore, in some instances, an object 220 may include one or more markers 230 identified by the object recognition application 125 that leads the object recognition application 125 to associate an object with more than one object in the data storage 171. In such instances, the user 210 may be presented with the multiple candidate identifications and may opt to choose the appropriate identification or input a different identification. The multiple candidates may be presented to the user 210 by any means. For instance, in one embodiment, the candidates are presented to the user 210 as a list wherein the "strongest" candidate is listed first based on reliability of the identification. Upon input by the user 210 identifying the object 220, the object recognition application 125 may "learn" from the input and store additional markers 230 in order to avoid multiple identification candidates for the same object 220 in future identifications.

Additionally, the object recognition application 125 may utilize other metrics for identification than identification algorithms. For instance, the object recognition application 125 may utilize the user's location, time of day, season, weather, speed of location changes (e.g., walking versus traveling), "busyness" (e.g., how many objects are in motion versus stationary in the video stream), as well any number of other conceivable factors in determining the identification of objects 220. Moreover, the user 210 may input preferences or other metrics for which the object recognition application 125 may utilize to narrow results of identified objects 220.

In some embodiments, the AR presentation application 121 may have the ability to gather and report user interactions with displayed indicators 300. The data elements gathered and reported may include, but are not limited to, number of offer impressions; time spent "viewing" an offer, product, object or business; number of offers investigated via a selection; number of offers loaded to an electronic wallet and the like. Such user interactions may be reported to any type of entity desired. In one particular embodiment, the user interactions may be reported to a financial institution and the information reported may include customer financial behavior, purchase power/transaction history, and the like.

In various embodiments, information associated with or related to one or more objects that is retrieved for presentation to a user via the mobile device may be permanently or semi-permanently associated with the object. In other words, the object may be "tagged" with the information. In some embodiments, a location pointer is associated with an object after information is retrieved regarding the object. In this regard, subsequent mobile devices capturing the object for recognition may retrieve the associated information, tags and/or pointers in order to more quickly retrieve information regarding the object. In some embodiments, the mobile device provides the user an opportunity to post messages, links to information or the like and associate such postings with the object. Subsequent users may then be presenting such postings when their mobile devices capture and recognize an object. In some embodiments, the information gathered through the recognition and information retrieval process may be posted by the user in association with the object. Such tags and/or postings may be stored in a predetermined memory and/or database for ease of searching and retrieval.

Turning to FIG. 4, a high level overview of a method 400 of presenting information based on a representation of a subject is provided. In an embodiment, the method includes recognizing, via a mobile device, the representation of the subject; identifying, via a computing device processor, the subject based on an analysis of the representation; retrieving information corresponding to the subject; and presenting information using the mobile device, the information related to the subject presented in conjunction with presentation of the representation.

Throughout this specification, the terms "AR system," "AR device," and "AR method" will be used. These terms refer to the aggregate functionality described herein. For example, the AR system can refer to the mobile device 100 in conjunction with the computing device processor 110, AR presentation application 121, Integrated circuit 180, networked resources, and/or any data storage and input/output devices, as disclosed herein. The AR method can refer to the use of all or part of the AR system to present information related to subjects based on identified representations. In an embodiment, this presentation occurs in an AR environment. The AR environment is not limited to real-time or concurrent presentation of information. For example, the presentation of information can be provided after a delay, such as by presenting an emailed list of all representations identified in a recorded video stream or saved still shot.

As used herein, objects are the visual or audible entities that are captured in a video or still shot. Objects include both subjects, which are entities that can be captured in a video or still shot, and representations, which are entities that correspond to subjects that cannot easily be captured in a video or still shot. An example of a subject is an automobile while an example of a representation is a trademark on an automobile, wherein the trademark corresponds to the company manufacturing the automobile. The subject corresponding to a representation can also be capturable in a video or still shot but for some reason the user is not able to do so when the user desires information on the subject. For example, an individual can be easily captured in a video or still shot but the individual may not be present. In this case, the user of the AR system and method described herein can use a photograph of the individual as a representation to receive information about the individual depicted in the photograph.

Turning now to block 402, the computing device processor 110 or a remote processor recognizes, via a mobile device, a representation of a subject. A representation is a broad concept and means anything that corresponds to a subject without actually being the subject. The representation can range from a very high level abstraction to one that is minimally distinguished from the subject. In one embodiment, for example, the representation is a screenshot of the subject, such as a screenshot of an application running on a mobile device, computer, or video game system. In another embodiment, the representation is a depiction of the subject, such as a photograph or painting depicting a subject. In some embodiments, the representation is an advertisement for a subject, such as a movie poster or newspaper advertisement. In another embodiment, the representation is a portion of the subject, such as a recorded portion of a television show or online video. In another embodiment, the representation is an identifying mark, such as a trademark, logo, barcode, or alphanumeric identifier. Each type of representation will be discussed in greater detail later with respect to FIGS. 6-10. Further, the types of representations disclosed herein are not limiting. Other types of representations are possible and the AR systems and methods disclosed herein are capable of recognizing them and providing information related to the subjects corresponding to those representations.

In block 404, the computing device processor 110 or a remote processor identifies the subject based on an analysis of the representation in conjunction with the AR presentation application 121. In some embodiments, the AR system and method concurrently provides information related to the subject during depiction of the representation as an object in the AR environment. For example, if a screenshot of an application is the representation, the subject is the application itself and the information provided in the AR environment will be related to the application. The AR presentation application 121 identifies the subject based on an analysis of the representation. In an embodiment, the AR application analyzes markers on or associated with the representation and, based on those markers, identifies the subject. In some embodiments, the analysis includes identifying one or more markers and then matching those markers with a listing of markers stored in one or more databases and/or memory devices. The listing of markers, in some embodiments, includes data related to markers, their respective association(s) with representations and/or links to the subjects associated with those representations. In one example, diagnostic features of screenshots for applications are stored in the database. The AR system searches the AR environment for objects that depict the diagnostic features and then correlates the features with the application. In another example, the database includes markers associated with trademarks and the companies represented by those trademarks. When the AR system and method identifies the markers associated with the trademarks, the company associated with that trademark is identified by retrieving the information from a database, such as data storage 171 on an Integrated circuit 180 or in the mobile device memory 120. In some embodiments, some or all the database is part of the mobile device and in other embodiments, some or all the database is located remotely to the mobile device. In some such embodiments, at least a part of the database is stored separately from the mobile device and accessed over a network.

Turning now to block 406, the mobile device 100 retrieves information corresponding to the subject. In some embodiments, the mobile device retrieves the information from the mobile device memory 120 or data storage 171 on the Integrated circuit 180. In another embodiment, the mobile device retrieves the information over a network, such as the same network used to identify the subject from the representation. In another embodiment, the mobile device retrieves information from a secure network associated with a financial institution. In another embodiment, the mobile device retrieves the information from a locally provided network. For example, a business may have a local wireless network that includes enhanced AR information for objects sold by the business.

The information received by the mobile device can vary broadly. In an embodiment, the information varies based on the subject, the environment, and/or the user. Types of information received will be discussed in detail with regards to the specific examples in FIGS. 6-10. In some embodiments, the information is customized with the user's or the subject's financial information. For example, the information on an application can provide the option to purchase the subject directly from the AR environment. The information can be customized with the user's financial accounts so that the user can select the account that will be used to purchase the subject. In another example, the financial information is customized based on the environment. For example, if the AR system and method determines, via the AR presentation application 121, that the user is present at a car dealership, e.g., the environment includes a number of cars of a single make identified by hood ornaments, the AR system and method can present information related to car loans that the user may qualify for based on income, down payment, credit rating, and/or other financial information.

In block 408, the mobile device 100 presents the information, the information related to the subject presented in conjunction with presentation of the representation. As discussed previously, in an embodiment the information is presented in real time concurrently with the video or still shot, such as on the mobile device display 130. In some embodiments, the information is presented as an overlay on top of the video or still shot. In other embodiments, the information is presented by itself, that is, not in conjunction with the video or still shot. In some embodiments, for example, a pop-up box can appear next to a screenshot of an application and allow the user to view the aggregate ratings for the application. In an embodiment, the pop-up box is selectable and allows the user to open up a webpage or application that provides more detailed information than can be presented in the AR environment. The information can be presented temporarily or permanently when the AR environment captures the representation. In another embodiment, the information is presented when the user moves a cursor over the representation, views the representation, or contacts the location on a touchscreen where the representation is depicted. The information can be presented visually, such as in 2D or 3D, or audibly, such as a recording that plays when a representation is captured by the AR system, or both visually and audibly.

To more clearly describe the relationships between objects, markers, subjects, and representations, FIG. 5 provides a block diagram illustrating an AR experience 500 in which a user 310 utilizes a mobile device 312 to capture video or still shots of an environment 250. The environment 250 includes objects 220 that are representations 342, 344 corresponding to unseen subjects. In an embodiment, the unseen subjects include both abstract subjects 343, such as trademarks, and unavailable subjects 345, such as individuals. For example, the environment can include an automobile hood ornament that corresponds to an automobile company as well as a picture of an individual that corresponds to that individual. The automobile company is an abstract subject, i.e., it is very difficult to capture an automobile company in a video or still shot. The individual, however, is merely an unavailable subject. If the individual were available, the individual could be captured in a video or still shot. In some embodiments, the environment 250 also includes subjects 346 that can be captured in a real-time video, such as an automobile. Both the representations 342, 344 and the subjects 346 that can be captured in a real-time video include markers (not shown) that are used for identification purposes by the AR system and method. The AR system may also provide recognition by the sensing of different light frequencies (i.e. X-ray, UV, infrared, radio, etc.) in order to have vision through objects for further object detection.

Turning briefly to FIG. 6, an example of an AR environment including both representations and subjects is provided. The mobile device 312 captures a second mobile device 602 in a video stream or screenshot 440. Application icons 608, 610 are depicted on the screen of the second mobile device 602 and represent the applications themselves. The AR device and method can identify the application icons 608, 610 and provide information related to the applications themselves through the AR environment. Additionally, the second mobile device 602 is a subject that can be captured directly. Information related to the second mobile device 602, such as the name of the device, the manufacturer of the device, or links to purchase the device can also be provided in the AR environment. This example is merely meant to illustrate that the environment 250 can include both representations 342, 344 and subjects 346 that can be captured in video. Both are depicted as objects 220 in the environment 250.

In FIG. 5, the mobile device 312 is capable of communicating over a network 502 with databases such as an AR database 504, a financial institution database 506, and/or any other type of database. In an embodiment, this allows the AR system to identify the representations 342, 344 based on markers stored in the databases and then retrieve information related to the corresponding subjects 343, 345 from the databases. This information is then presented to the user 310 through the mobile device in conjunction with the display of the representations 342, 344, as discussed previously.

In some embodiments, the information provided by the real-time video stream may be compared to data provided to the system through an API. In this way, the data may be stored in a separate API and be implemented by request from the mobile device and/or server accesses another application by way of an API.

Turning again to FIG. 6, an embodiment of the invention is disclosed wherein the representation is a screenshot of the subject on a computing device. For example, the screenshot can be of an application executing or installed on a computing device. In one embodiment, the application is on a mobile device, such as a portable phone or PDA. The application may also be installed on or executing on a laptop, desktop, or tablet computer. In some embodiments, the application is a computer game on a gaming system, television, or handheld gaming device. In one embodiment, the application is recognized by a screenshot of an icon placed on the desktop or screen of the computing device after the application is installed. In another embodiment, the application is recognized by a screenshot of the application during execution. FIG. 6 depicts a second mobile device 602 having an application 606 executing on the screen 604 while two icons 608, 610 representing additional applications are present at the base of the screen 604. In one embodiment, the AR system and method described herein allows one user to take a real-time video of an application using a first mobile device 312, wherein the application is executing on a second mobile device 602. The AR depiction 440 on the first mobile device 312 presents information relating to the application or applications 606, 608, 610 on the second mobile device 602. The AR depiction 440 can present the information immediately or concurrently with the action taking place on the second mobile device 602, or the AR depiction 440 can be called up at a later point and present the information then.

In one embodiment, the AR system and method presents information related to each of the applications through callouts, pop-ups, or selectable links 612, 614, 616, 618. In another embodiment, the AR system and method presents information audibly when a representation is highlighted or selected. In a still further embodiment, the AR system and method presents information in a list or written form, such as in a document, webpage, email, or text message. Other types of presentation are possible and the aforementioned list is not intended to limit the manner by which the information relating the subjects can be presented.

The information presented relates to the applications themselves, and in some cases relates to specific characteristics of applications such as frequent updating, frequently changing prices, customization, and the existence of the same application across multiple computing platforms. In an embodiment, the information includes the name of the application 612, the manufacturer of the application, the cost of the application, the version of the application, the operating systems that the application is capable of executing on, and other general information related to the application. For example, the AR system can identify an application and determine whether the application is a more recent version or upgrade of the application than the version existing on the user's mobile device. Applications are frequently updated and being able to identify new versions provides valuable information to users. In another embodiment, the information provides a link to further information about the application. For example, the AR system can identify an application and then provide a link to reviews or rating for the application 616. In one embodiment a general rating is provided and then a link to detailed or individual user reviews is provided. In a still further embodiment, the category of the application can be determined and similar applications within the same category can be presented to the user.

In a still further embodiment, information on the application can include a link to download 614 and/or install the application through the AR environment. In one embodiment, the information can be customized for the user of the system and/or method by including the user's financial information with the application. The AR system can automatically purchase the application when selected in the AR environment. In another embodiment, the application itself can be customized with the user's financial information 618. For example, the user's previous purchases at a business can be uploaded into an application related to the business. In some cases, this may provide the user with enhanced privileges based on customer loyalty programs or the like. Many finance and budgeting applications can be enhanced by financial information of the user, including account numbers, transactions, and/or balance information. In a still further embodiment, the financial information used to customize the information relates to the cost history of the product. The financial institution may be able to track the price of certain types of products or subjects depicted in the AR environment and add value to the user's experience by updating the subject information with the price history of the subject corresponding to the representation.

Turning now to FIG. 7, an embodiment of the invention is disclosed wherein the representation is a depiction 700 of the subject or subjects. In an embodiment, the depiction is a photograph of the subject. For example, individuals 702, 704, 706 can be depicted in a photograph and identified by markers specific to those individuals. Analysis can be performed on the photograph using facial recognition software or other analytical devices and information pertaining to the identified individuals can be presented in the real-time AR environment. In another embodiment, the depiction is a picture or painting of the subject. In some embodiments, the picture or painting accurately represents the subject so that the AR system identifies the subject. In other embodiments, the markers alone are sufficient to identify subjects from abstract pictures or paintings. For example, if a bowtie and a red hat are diagnostic features of an individual, the AR system and method can identify the individual from a painting of the individual where the bowtie and red hat are depicted. This identification is often assisted by contextual clues in the AR environment. For example, if the individual is a representative of a business and a trademark representing the business is also present in the picture or painting, then the AR system can evaluate the individual using the additional markers present in the environment.

The information presented in the AR environment with the representations corresponds to the subjects depicted by the representations. When the subject is an individual, the individual's name 708, contact information 710, options to add the individual as a contact 712, links to information such as social networking sites related to the individual 714, and the like, can be presented with the representation in the AR environment. Time sensitive information about individuals identified in the AR environment can also be presented, such as links to buy tickets to the individual's upcoming performances, reminders about the individual's upcoming birthday 716, and other time-sensitive information.

Depictions of media (not shown) can also be analyzed by the AR system. For example, the cover of a book, the cover of a CD, or the cover of a magazine can be analyzed based on a depiction in a photograph, picture, or painting. A photograph of a book cover can be analyzed by the AR system and markers associated with the title, the subjects depicted on the cover, and any other diagnostic features on the cover can be identified. Information such as the author of the book, other books by the author, reviews of the book, a link to purchase the book, and the like can be presented in the AR environment with the presentation of the representation of the book.

Information presented in conjunction with depictions can also be customized with financial information. In an embodiment, the user can identify the individual in the depiction and initiate a transfer of money to or from the individual 718. In another embodiment, the AR environment can present financial information associated with the subjects depicted in the AR environment. For example, prices of products depicted in the AR environment can be presented along with the depiction. In some embodiments, the AR system includes privacy controls to allow individuals represented in depictions to control the information presented in association with their depiction. If an individual authorizes release of information, the AR environment can be supplemented with said information. For example, an individual may authorize release of information related to businesses patronized by the individual. A merchant using an embodiment of the invention could capture a depiction of the individual and recognize that the individual has made a purchase at her store.

In FIG. 8, an embodiment of the invention is disclosed wherein the representation is an advertisement 800 for a subject. The advertisement can be a flyer, poster, or other type of visual advertisement for the subject. In the example depicted in FIG. 8, a movie poster 802 is captured in a real-time video stream. The AR system and method identifies the movie represented by the poster advertisement and presents information, such as reviews of the movie 804, options to buy tickets to the movie 806, or a DVD of the movie 808, or profiles of the actors in the movie. In an embodiment, the AR system and method presents the information close to specific representations in the advertisement. For example, in FIG. 8, a biography 810 of the actor is presented close to the actor's name in the movie poster. Additionally, further information related to the actor, such as other movies the actor was in 812, can be presented in the AR environment 250. In another embodiment, the advertisement is in a newspaper or flyer (not shown). The information presented in association with the advertisement may be details of a sale occurring at the business in the advertisement, or a link to the business's website. In a still further embodiment, the advertisement is a movie preview and the AR system identifies the movie being advertised in the preview. In some embodiments, the advertisement is audible in nature. For example, the AR system may detect a commercial theme song or product jingle in the AR environment and present information relating to the product being advertised in the commercial.

The type of information that can be presented in association with an advertisement includes information on the subject being advertised, options to interact with the subject, and associated information. Advertisements include many options for presenting information customized by financial information from a financial institution. For example, information presented in conjunction of a subject may include the sales price or the price history from all purchasers of the subject available in the financial institution's database. For example, the AR environment can not only allow the user to purchase an item directly but can also inform the user of the remaining balance in the user's account after the purchase. The user can include a budget associated with the financial accounts and the AR environment can present information related to the user's budget with the advertisement, e.g., you budgeted $100 for entertainment this month and this show costs $40, leaving you $60 left in your entertainment budget.

In FIG. 9, an embodiment of the invention is disclosed wherein the representation is a portion of the subject 900 that is captured in a video or screenshot. For example, a portion of a television show may be recorded and identified by the AR system and method. In another example, a portion of a movie, music video, text from within a book, online video, song, lecture, and the like are captured by the AR system and identified. In the example depicted in FIG. 9, a real-time video of a television show 902 is captured by the AR system and method. The television show is identified by the portion of the television show that is recorded and information relating to the show itself is presented to the user. For example, the name of the show, the option to buy the DVD of the show 904, and in some embodiments the ability to set a home recording system such as a DVR to record the show remotely 906 is presented to the user. Further information, such as a plot summary of the specific episode 908 can also be provided once the subject, i.e., the show itself, is identified. Online videos and movies can also be captured and supplemented in a similar manner. In another embodiment, text from within a book or magazine is identified and information is presented about the entire book. For example, a quote from a book may be reproduced on a sheet of paper. The AR system and method can capture the text on the sheet of paper and identify the book from which the passage comes. Links to purchasing the book, reviews of the book, the text before and after the representative text, and the like can be included in the presentation. In a still further embodiment, a live lecture can be recorded and supplemented with information presented related to the subject of the lecture. For example, keywords, pictures, or the lecturer can be identified as described herein and the information can be presented as the lecture is occurring. This can be advantageously used in educational settings to present information related to the subject matter that is not discussed in the lecture.

The type of information that can be presented in conjunction with a portion of a subject includes the full title and identifying information of the portion, a link to the full subject, or the like. The AR system and method advantageously allows users to identify subjects from a mere portion of the subject captured in a mobile device. By providing the capability to identify the full subject from a representative portion of the subject, the AR system and method described herein can supplement the portion with detailed information. In some embodiments, the information related to the subject can be customized using financial information, as described herein.

Turning now to FIG. 10, an embodiment of the invention is disclosed wherein the representation is an identifying mark 1000. In some embodiments, the identifying mark is a trademark, service mark, logo, insignia, bar code, or other mark that identifies a product or producer. In another embodiment, the representation is an alphanumeric identifier such as an address, email address, phone number, URL address, or geographic coordinates. In an embodiment, the AR system and method recognizes the identifying mark or alphanumeric identifier based on markers associated with the mark or identifier. The marks and associated markers can be stored locally on the mobile device or stored in a remote database. In one embodiment, the identifying marks are associated with a specific business, team, or organization. In another embodiment, the identifying marks are associated with a specific person or place. For example, a phone number can be captured in a video or still shot and the AR environment can identify the person associated with the phone number. If pictures of the person are available online or in a database, such as the user's local database on the mobile device, the AR device can provide the individual's picture in conjunction with the user's name, email address, or telephone number. Street addresses can be identified and a street view picture of the address can be presented as information overlaid on the street address. In the example depicted in FIG. 10, a sports team logo 1002 is present on a t-shirt 1004. The AR system and method is able of identifying the logo 1002 from markings and presenting information related to the team that the logo represents.

In some embodiments, information such as contact information, name, or category is provided with the representation. For example, the AR method may provide information relating to the team's schedule 1006. The AR method may provide information relating to the team's tickets, as well as the ability to purchase tickets directly 1008. The information can be customized using the user's financial information. For example, the AR method can determine that a user is a supporter of a team based on purchases at the team's facility, on the team's website, or other purchases that can be identified as related to the team. Once known, this information can be used to customize offers in the presented information. For example, a fan of a team does not need information on what the team logo represents. Instead, the individual may be interested in the team schedule, seeing tickets and merchandise individuals associated with the user purchased, or purchasing team gear and hence this information can be preferentially presented to the user in the AR environment.

Thus, methods, systems, computer programs and the like have been disclosed that provide for using real-time video analysis, such as AR or the like to assist the user of mobile devices with commerce activities. Through the use real-time vision object recognition objects, logos, artwork, products, locations and other features that can be recognized in the real-time video stream can be matched to data associated with such to assist the user with commerce activity. The commerce activity may include, but is not limited to; conducting a transaction, providing information about a product/service, providing rewards based information, providing user-specific offers, or the like. In specific embodiments, the data that matched to the images in the real-time video stream is specific to financial institutions, such as customer financial behavior history, customer purchase power/transaction history and the like. In this regard, many of the embodiments herein disclosed leverage financial institution data, which is uniquely specific to financial institution, in providing information to mobile devices users in connection with real-time video stream analysis.

The systems, methods, computer program products, etc. described herein, may be utilized or combined with any other suitable AR-related application. Non-limiting examples of other suitable AR-related applications include those described in the following U.S. Provisional Patent Applications, the entirety of each of which is incorporated herein by reference:

| U.S. Provisional Ser. No. | Filed On | Title |
| --- | --- | --- |
| 61/450,213 | Mar. 8, 2011 | Real-Time Video Image Analysis Applications for Commerce Activity |
| 61/478,409 | Apr. 22, 2011 | Presenting Offers on a Mobile Communication Device |
| 61/478,412 | Apr. 22, 2011 | Real-Time Video Analysis for Reward Offers |
| 61/478,394 | Apr. 22, 2011 | Real-Time Video Image Analysis for Providing Targeted Offers |
| 61/478,399 | Apr. 22, 2011 | Real-Time Analysis Involving Real Estate Listings |
| 61/478,402 | Apr. 22, 2011 | Real-Time Video Image Analysis for an Appropriate Payment Account |
| 61/478,405 | Apr. 22, 2011 | Presenting Investment-Related Information on a Mobile Communication Device |
| 61/478,393 | Apr. 22, 2011 | Real-Time Image Analysis for Medical Savings Plans |
| 61/478,397 | Apr. 22, 2011 | Providing Data Associated With Relationships Between Individuals and Images |
| 61/478,408 | Apr. 22, 2011 | Identifying Predetermined Objects in a Video Stream Captured by a Mobile Device |
| 61/478,400 | Apr. 22, 2011 | Real-Time Image Analysis for Providing Health Related Information |
| 61/478,411 | Apr. 22, 2011 | Retrieving Product Information From Embedded Sensors Via Mobile Device Video Analysis |
| 61/478,403 | Apr. 22, 2011 | Providing Social Impact Information Associated With Identified Products or Businesses |
| 61/478,415 | Apr. 22, 2011 | Providing Location Identification of Associated Individuals Based on Identifying the Individuals in Conjunction With a Live Video Stream |
| 61/478,419 | Apr. 22, 2011 | Vehicle Recognition |
| 61/478,417 | Apr. 22, 2011 | Collective Network of Augmented Reality Users |
| 61/508,985 | Jul. 18, 2011 | Providing Information Regarding Medical Conditions |
| 61/508,946 | Jul. 18, 2011 | Dynamically Identifying Individuals From a Captured Image |
| 61/508,980 | Jul. 18, 2011 | Providing Affinity Program Information |
| 61/508,821 | Jul. 18, 2011 | Providing Information Regarding Sports Movements |
| 61/508,850 | Jul. 18, 2011 | Assessing Environmental Characteristics in a Video Stream Captured by a Mobile Device |
| 61/508,966 | Jul. 18, 2011 | Real-Time Video Image Analysis for Providing Virtual Landscaping |
| 61/508,969 | Jul. 18, 2011 | Real-Time Video Image Analysis for Providing Virtual Interior Design |
| 61/508,971 | Jul. 18, 2011 | Real-Time Video Image Analysis for Providing Deepening Customer Value |
| 61/508,764 | Jul. 18, 2011 | Conducting Financial Transactions Based on Identification of Individuals in an Augmented Reality Environment |
| 61/508,973 | Jul. 18, 2011 | Real-Time Video Image Analysis for Providing Security |
| 61/508,976 | Jul. 18, 2011 | Providing Retail Shopping Assistance |
| 61/508,944 | Jul. 18, 2011 | Recognizing Financial Document Images |

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention as disclosed herein. Therefore, it is to be understood that, within the scope of the appended claims, the invention may be practiced other than as specifically described herein.

What is claimed is:

1. A method for presenting information based on a captured representation of a subject, the method comprising:
   determining that a mobile phone is capturing a real-time video of a scene, wherein the scene comprises at least one representation of an individual of interest to a user of the mobile phone, wherein the representation is a picture of the individual;
   determining positioning information of the mobile phone, wherein the positioning information is associated with the real-time video being captured by the mobile phone;
   recognizing, via the mobile phone, the representation of the individual in the real-time video based on an analysis of markers associated with the representation;
   identifying, via a computing device processor, the individual using a database comprising a plurality of individuals and associated representations;
   confirming the identification of the individual to the desired confidence level;
   retrieving information corresponding to previous transfers of money between the user and the individual;
   presenting the information using the mobile phone, the information related to the individual presented in conjunction with presentation of the representation; and
   superimposing the information over the video being captured by the mobile phone.

2. The method of claim 1, further comprising initiating a transfer of money to the individual via the mobile phone.

3. The method of claim 1, wherein the representation is a depiction of the individual in a medium selected from the group consisting of a photograph, a painting, a poster, and a picture.

4. The method of claim 1, wherein the representation comprises an identifying mark of the individual.

5. An apparatus for presenting information based on a captured representation of a subject, the apparatus comprising:
   a computing platform having a processor, a memory in communication with the processor,
   logic stored in the memory, executable by the processor and configured to determine that a mobile phone is capturing a real-time video of a scene, wherein the scene comprises at least one representation of an individual of interest to a user of the mobile phone, wherein the representation is a picture of the individual;
   positioning logic stored in the memory, executable by the processor and configured to determine positioning information of the mobile phone, wherein the positioning information is associated with the real-time video being captured by the mobile phone,
   image capture logic stored in the memory, executable by the processor and configured to capture the video comprising a representation of the individual in the real-time video based on an analysis of markers associated with the representation,
   analysis logic stored in the memory, executable by the processor and configured to analyze the representation in the video,
   image identification logic stored in the memory, executable by the processor and configured to identify the individual using a database comprising a plurality of individuals and associated representations,
   confirmation logic stored in the memory, executable by the processor and configured to confirm the identification of the individual to the desired confidence level;
   retrieval logic stored in the memory, executable by the processor and configured to retrieve information corresponding to previous transfers of money between the user and the individual; and
   presentation logic stored in the memory, executable by the processor and configured to present the information related to the individual in the video, and superimpose the information over the video being captured by the mobile phone.

6. The apparatus of claim 5, further comprising a network interface device, wherein the network interface device is configured to wirelessly connect to the database comprising the plurality of individuals and associated representations.

7. The apparatus of claim 5, further comprising customization logic stored in the memory, executable by the processor, and configured to customize a presentation for a user.

8. The apparatus of claim 7, further comprising transfer logic stored in the memory, executable by the processor and configured to initiate a transfer of money to the individual via the mobile phone.

9. The apparatus of claim 5, further comprising a display, wherein the information is presented on the display.

10. A computer program product, comprising a non-transitory computer-readable medium comprising computer-executable instructions for presenting information based on a captured representation of a subject, the instructions comprising:
   instructions for determining that a mobile phone is capturing a real-time video of a scene, wherein the scene comprises at least one representation of an individual of interest to a user of the mobile phone, wherein the representation is a picture of the individual;
   instructions for determining positioning information of the mobile phone, wherein the positioning information is associated with the real-time video being captured by the mobile phone;
   instructions for capturing the video comprising a representation of the individual in the real-time video based on an analysis of markers associated with the representation;
   instructions for analyzing the representation in the video;
   instructions for identifying the individual using a database comprising a plurality of individuals and associated representations;
   instructions for confirming the identification of the individual to the desired confidence level;

instructions for retrieving information corresponding to previous transfers of money between the user and the individual;

instructions for presenting the information related to the individual in the video; and instructions for superimposing the information over the video being captured by the mobile device.

11. The computer program product of claim 10, further comprising instructions for initiating a transfer of money to the individual via the mobile phone.

* * * * *